United States Patent [19]

Law et al.

[11] Patent Number: 4,514,132
[45] Date of Patent: Apr. 30, 1985

[54] TRAILER WITH RAMP

[75] Inventors: Denny B. Law, San Marcos; Bernhardt P. Goettker, Escondido, both of Calif.

[73] Assignee: Unique Functional Products, San Marcos, Calif.

[21] Appl. No.: 470,230

[22] Filed: Feb. 28, 1983

[51] Int. Cl.³ .............................................. B60P 3/07
[52] U.S. Cl. ................................ 414/537; 280/490 R
[58] Field of Search ................... 280/490 R; 414/537, 414/538

[56] References Cited

U.S. PATENT DOCUMENTS

| | | | |
|---|---|---|---|
| 3,822,798 | 7/1974 | Neff | 414/537 |
| 4,144,979 | 3/1978 | Leach, Jr. et al. | 414/537 |
| 4,248,451 | 2/1981 | Usinger | 280/490 R |
| 4,281,950 | 8/1981 | Lehman et al. | 414/537 X |

Primary Examiner—Robert B. Reeves
Assistant Examiner—Glenn B. Foster
Attorney, Agent, or Firm—Duane C. Bowen

[57] ABSTRACT

Trailer, for two or more vehicles such as motorcycles or three-wheelers, having a narrow tongue extending forwardly from a broad platform, the tongue adapted to support the front wheel of one vehicle in position disposed mostly forward of the platform, a tube outlying and above the tongue and body having fittings for attachments of vehicle tie-down straps. A pivotally mounted rear loading ramp is formed by a first tube bent into a U-shape and formed by one or two other tubes parallel to the base of the U-shape and secured to the arms of the U-shape and legs extending laterally from the base of the U-shape, in an oblique plane, to support the base above ground in the down position of the ramp.

20 Claims, 12 Drawing Figures

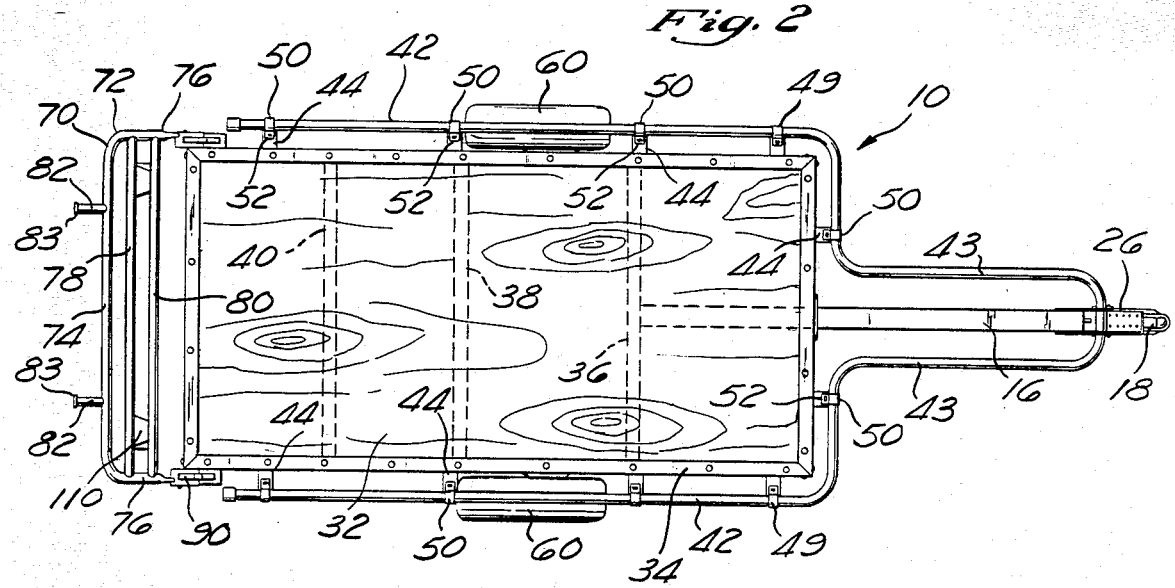
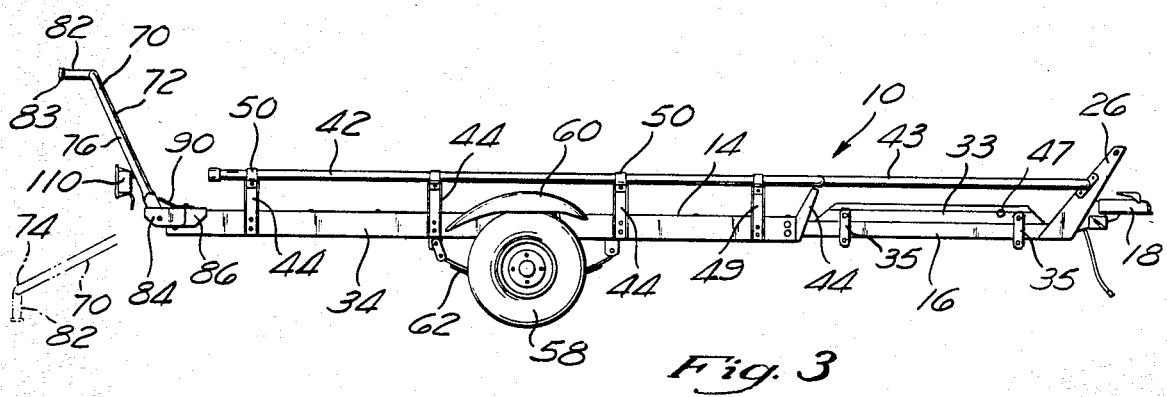
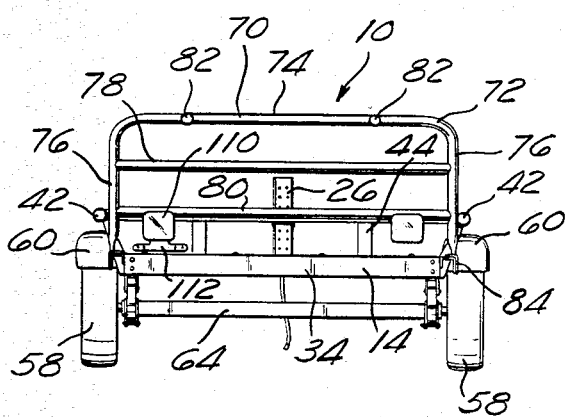
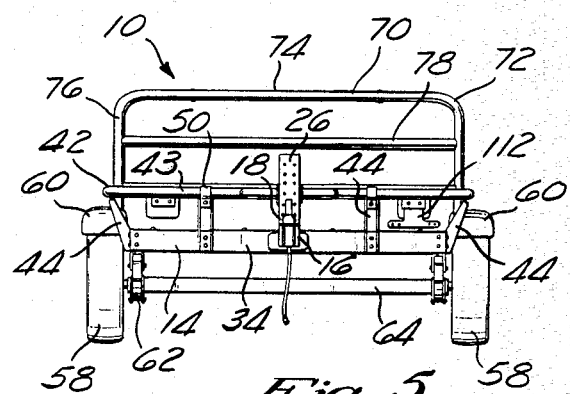

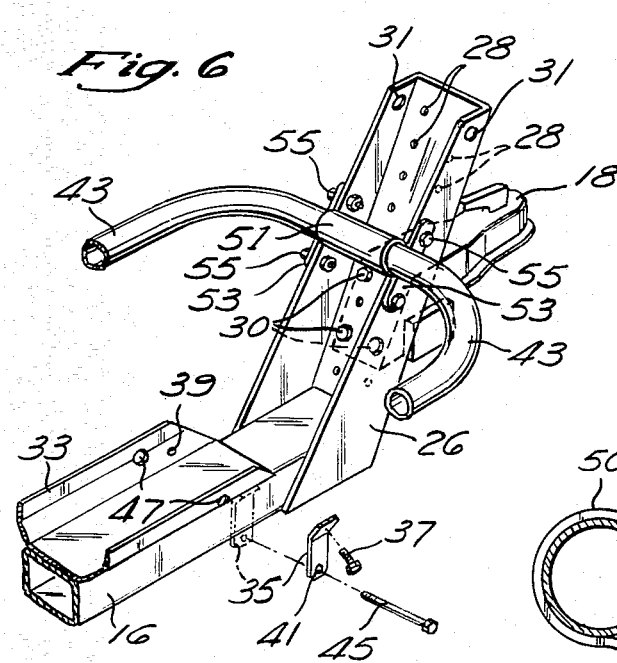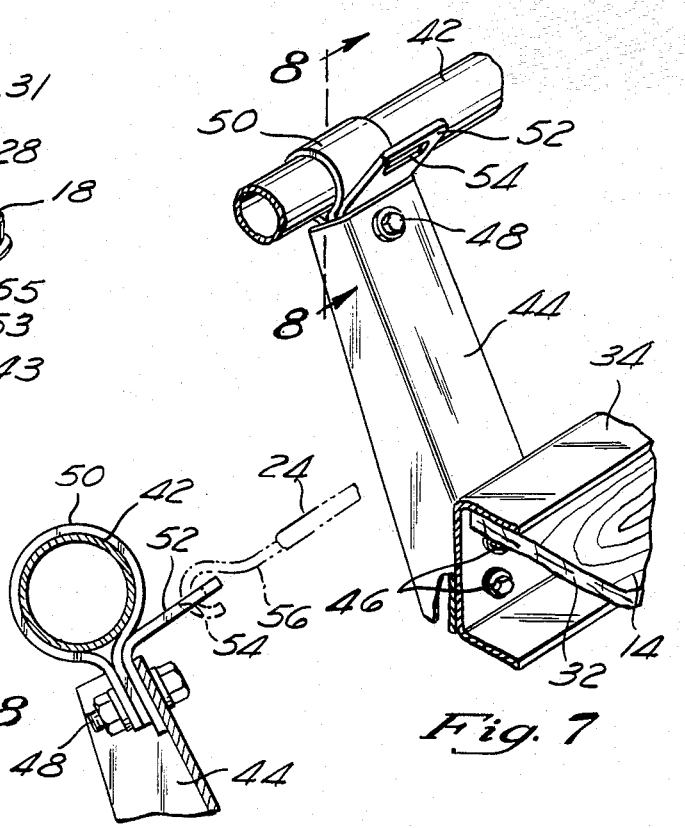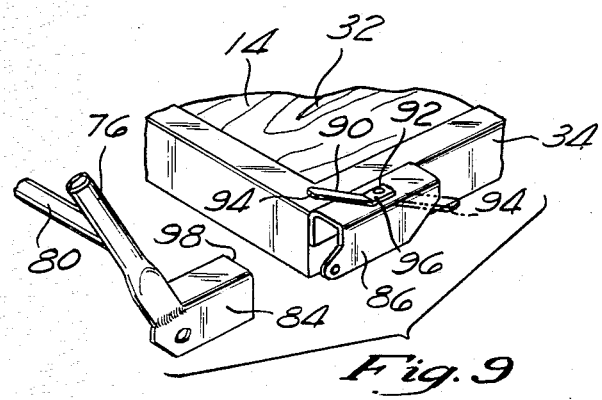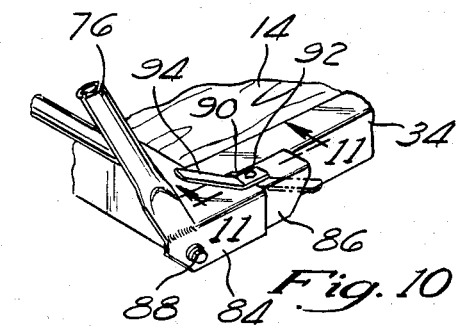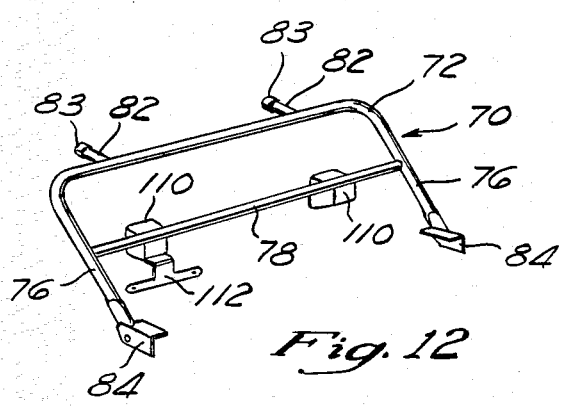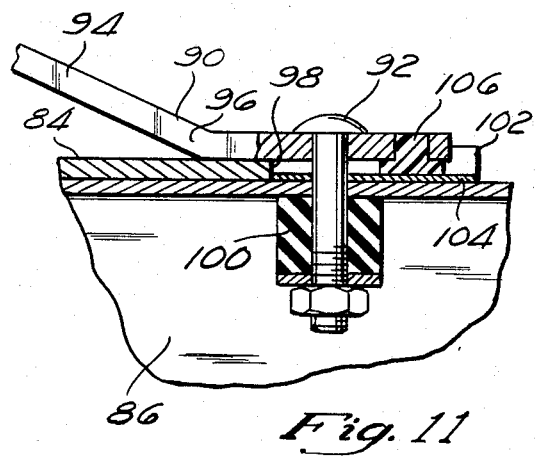

TRAILER WITH RAMP

BRIEF SUMMARY OF THE INVENTION

Background and Objects

Our invention relates to a multi-vehicle trailer for motorcycles and the like having a pivotally mounted ramp fabricated from tubing for loading and unloading the trailer.

At the time of making this invention, we were designing trailers for motorcylces, three-wheelers and the like. Riding motorcycles, three-wheelers, dune-buggies and the like often is a family affair or otherwise involves several vehicles, either two or more of the same variety or two or more different varieties. Such vehicles are often used at a remote location and it is desirable or necessary to transport such vehicles to such locations, i.e., it is impractical or impossible to drive several of such vehicles on public roads to such remote locations. It is an objective of our invention to provide a trailer adapted to transport two or more motorcycles, three-wheelers or dune-buggies. Further objectives include to provide such a trailer of maximum capacity for this particular job with respect to size and cost and to devise adequate security in holding such vehicles in place on the trailer including providing tie-down fixtures well located for their functions.

As motorcycles, etc., are heavy, ramps are needed to load the same. We have not found satisfactory loading ramp designs in the prior art. Desirable characteristics of a loading ramp for motorcycles or the like include the following factors, and it is an objective of our invention to devise a design having those characteristics:

(a) Economy of materials and manufacturing expenses, so as to not add unduly to trailer costs, while having due strength and service life and while having an attractive appearance.

(b) Low weight for handling and transportation. Low cost frequently will be associated with low weight.

(c) Suitable load-supporting features for loading tired cycles such as three-wheelers and two-wheelers including motorcycles, mopeds, trailbikes, etc.

(d) Secure and convenient carrying of the ramp during travel and quick and easy use for unloading.

(e) Additional use as a retainer or gate for vehicles carried on the trailer and to support rear lights and license plate.

(f) Providing features necessary for loading vehicles while avoiding unnecessary structure.

Our invention will be best understood, together with additional advantages and objectives thereof, when read with reference to the drawings.

THE DRAWINGS

FIG. 1 is a perspective of our new trailer. Three representations of so-called "three-wheelers" are shown being transported by the trailer. A loading ramp used in loading the three-wheelers, or in loading other vehicles, is shown on the left.

FIG. 2 is a plan view of the trailer.

FIG. 3 is a side view of the trailer.

FIG. 4 is a rear view of the trailer.

FIG. 5 is a front view of the trailer.

FIG. 6 is an enlarged, partial perspective view of the bow assembly of the trailer.

FIG. 7 is an enlarged, partial perspective view of a bracket and rail assembly.

FIG. 8 is an enlarged view, partly in section, taken on line 8—8 of FIG. 7.

FIG. 9 is an exploded, partial perspective view of a ramp-mounting assembly.

FIG. 10 is like FIG. 9 but with the parts in installed positions.

FIG. 11 is an enlarged view, partly in section, taken on line 11—11 of FIG. 10.

FIG. 12 is a perspective view of a modified ramp.

Figure 1:
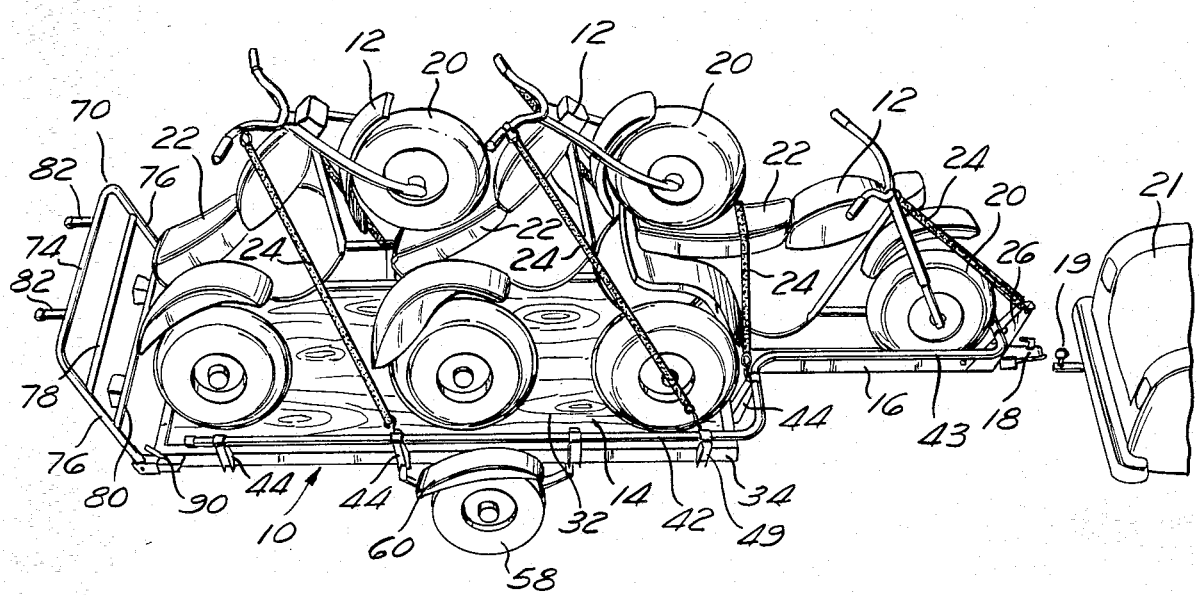

Our multi-vehicle trailer 10 can carry a number of recreational vehicles, such as three vehicles 12 known as three-wheelers as shown in FIG. 1, or such as a three-vehicle and a dune buggy, or such as four motorcycles at one time. Trailer 10 has a main broad flat platform 14 extending throughout the major portion of the trailer body and extending to the rear of the trailer and trailer 10 has a narrow forward track member 16 extending forwardly from main platform 14 in the manner of a tongue and having ball coupler 18 to connect to the ball 19 of a towing vehicle 21, so that track member 16 has the function of a tongue.

If several three-wheelers were to be transported, as shown in FIG. 1, the front wheel 20 of one three-wheeler 12 is shown as being supported on track member 16. The front wheels 20 of the two rear three-wheelers 12 are shown as resting on the seats 22 of the vehicles in front of them. If two three-wheelers were to be transported, the front wheel 20 of a forward three-wheeler 12 could by supported on track member 16 and the second rear three-wheeler 12 could be supported flat on platform 14 behind the forward three-wheeler 12. If one three-wheeler and a dune buggy were to be transported, the front wheel 20 of the three-wheeler could be supported on track member 16 and the dune buggy could be supported flat on platform 14 behind the three-wheeler. If four motorcylces were to be transported on trailer 10, a first forward motorcycle could have its front wheel supported on track member 16, a second motorcycle could be supported on platform 14 directly behind the first motorcycle, either facing forward or aft, and third and fourth motorcycles could be supported on platform 14 on the sides of the first and second motorcycles. Straps 24 would be used to secure such three-wheelers, dune buggies or motorcycles in place.

Track member 16 is shown as being formed by a single beam defining a track wide enough to support only a single wheel 20 of a three-wheeler, motorcycle or the like. Beam 16 can be formed by a rectangular hollow extrusion about three inches wide and two inches high, depending on all thickness and the metal used. With most materials, six inches would be the maximum width needed. Member 16 is a track in the sense it supports wheel 20 as it rolls forwardly into place in loading and rearwardly out of place in unloading. Further, track member 16 supports wheel 20 in stationary position during transportation. It will be observed that main platform 14 is several times wider than the beam track member 16, i.e., as indicated, track member can be as narrow as about 3-4" wide and platform 14 can be about 48" wide, i.e., using a standard plywood 4'×8' panel. For some applications, i.e., a dune buggy with broad tires, the 48" width of a standard plywood sheet is hardly adequate and it is important that the tubular retainer rails 42 be spaced outwardly from platform 14 in plan view, thereby permitting the planes of the sides of the dune buggy tires to extend beyond the planes of the sides of platform 14. Note also that some extra room between the planes of the sides of platform 14 and the planes of rails 42 permits some mislocation of dune buggies or three-wheelers of maximum widths, on platform 14, without interference with rails 42.

Track member 16 has a bow member 26 at its forward end extending in an oblique plane forwardly as it extends upwardly. Bow member 26 has a channel shaped for strength. Bow member 26 has a series of openings 28 therealong to receive bolts 30 securing ball coupler 18 to bow member 26, so that ball coupler 18 can be adjusted for the height of the ball 19 on the towing vehicle 21 and platform 14 can be maintained in a plane generally parallel to the ground. Bow member 26 has a pair of openings 31 for securing hooks 56 of tie-down straps 24 to secure the front end of the forward vehicle supported on trailer 10.

It will be observed, hence, that track member 16 serves several purposes:

(a) a trailer tongue to hitch to a towing vehicle, (b) a track for the forward wheel 20 of the forward vehicle being transported in moving wheel 20 forward into place and rearward for unloading, (c) a support for the forward wheel 20 of the forward vehicle during transportation, and (d) a leveling device responsive to the location of attachment of ball coupler 18 to openings 28 of bow member 26. The operating latching mechanisms of ball coupler 18 and of ball hitch 19 follow standard ball coupling constructions.

When a three-wheeler front wheel 20 is being supported on track beam 16, it will approximately fit the space between the front return bends 43 of tube rails 42 and there is no problem of lateral escape from beam 16 or of wheel 20 slipping down between one side of tube bend 43 and beam 16. When a motorcycle front wheel is being supported by beam 16, however, the space between the parallel tube sections at return bend 43 (which may be about sixteen inches) is excessive and the tube rails would not be close enough to beam 16 to prevent the motor cycle wheel from slipping down between one side of beam 16 and tube rail 42 at return bend 43. Therefore, an additional retaining member is needed to retain a motorcycle front wheel on beam 16. This is shown in FIGS. 6 and 3 as having the form a trough securing member 33 attached on the top of beam 16. Trough 33 was about thirty-nine inches long and about four and a half inches wide on the prototype. In order to prevent reducing the strength of beam 16 by openings to secure trough 33, the preferred structure is to secure trough 33 by two straps 35 at each end secured by bolts 37 extending through openings 39 in trough 33. The lower ends of straps 35 have openings 41 receiving a tension bolt 45 which extends below beam 16 to clamp trough 33 to beam 16. Trough 33 has a pair of openings 47 at its forward end to receive hooks 56 of tie-down straps 24.

In the construction of main platform 14, it is convenient and economical to use plywood as the planar surface. In prototyes, we have used a standard 4'×8' sheet 32 of exterior grade fir ⅝- plywood bolted or otherwise secured to a metal rectangular frame 34 of channel-shaped cross-sections. Several lateral support Z-shaped members 36, 38 40 extend laterally under platform sheet 32 to add further support to sheet 32. The beam that forms track 16 is shown to extend rearwardly to attach to the forward lateral support 36, to strengthen the assembly. The basic 4'×8' size is sufficient, together with the load carrying capacity of track member 16, to provide enough room for at least the number of vehicles mentioned above, namely: (a) two or three three-wheelers, (b) a three-wheeler and a dune buggy, (c) four motorcycles, etc. However, as noted elsewhere, the effective 4'×8' size is increased by locating tube rail 42 outboard of the edges of platform 14, as shown in the plan view of FIG. 2.

The vehicles being transported have to be secured in place. Tensed tie-down straps 24 are used secured to or extending over the vehicles being transported. The outer ends of straps 24 need to be fastened securely to trailer 10 at advantages locations. We have provided this in the form of a tubular retainer 42 which preferably is continous on each side of the trailer for structural purposes. Retainer 42 serves several purposes:

(a) strap securement, (b) railing function relative to preventing transported vehicles from going over side edges of the trailer, (c) some added strength of assembly, and (d) aesthetics.

Brackets 44 are of partly channel-shaped cross-sections secured to frame 34 by bolts 46. Tube 42 is secured by bolts 48 to the top of brackets 44 by looped strap clamps 50. Also secured by bolts 48 are tie-down clips 52 with openings 54 to secure straps 24 as by hooks 56. In plan view, tube 42 extends forwardly along the sides of platform 14 and bends around the platform front edge and then bends along the sides of track 16 and secures to bow member 26 at the front. Tube 42 in plan view outlies the borders of platform 14, so as to permit loads slightly wider than forty-eight inches. Likewise, tube 42 outlies the borders of beam 16 to accommodate the width of the front wheel tire 20 of a three-wheeler 12.

In prototypes, we have formed tube 42 in four sections: (a) two rear straight tubes to the middle of front side brackets 49, and (b) two forward bent tubes bending around the front platform corners and bending parallel to beam 16, and then bending again to join together in a tubular fitting 51. Fitting 51 has flanges 53 secured to bow member 26 by bolts 55.

Tube 42 is disposed in a plane parallel to and spaced above the plane of platform 14 so that it can serve the purpose of a rail to prevent vehicles from sliding off platform 14 and track 16. The location in this upper plane is also advantageous for location of straps securing clips 52 and for added strength of the assembly. Clips 52 are provided at the four bracket locations on each side of platform 14 and at two bracket locations at the front of platform 14. This number and location of clips 52 provides a suitable variety of sites for strap securements for various types and numbers of vehicles to be transported on trailer 10. Straps 24 also can be hooked to openings 31 in bow member 26 and to opening 47 in trough 33.

It will be observed we have provided a low weight assembly. Trailer 10 can tow easily even behind small cars and small pickups. A low center of gravity is provided for a smooth and stable ride. The adjustable tongue height means that trailer 10 can ride level whether towed by a small car or a large motorhome. When not in use, the trailer will take minimum storage space. Preferably, the structures are mostly secured with bolts so that parts can be economically replaced if the trailer 10 gets damaged. The numerous tie-down points are conveniently located. No other means of transportation is known which handles the variety of loads in such a small space. For example, it is believed to be an outstanding achievement to haul 3 three-wheelers in basically a 4'×8' trailer. The load capacity of the trailer 10 shown is 1150 pounds, the trailer weight is 330 pounds, the gross vehicle weight rating is 1480 pounds, the overall length is 14' 6", the overall width is 5' 5". The trailer wheels 58 preferably have tire sizes of 5.70×8-load range C. Fenders 60 are optional. Leaf springs 62 are shown as supporting axle 64.

A smaller trailer with a 4'×4' platform 14 can be constructed for smaller loads, i.e., two three-wheelers. Such 4'×4' trailer otherwise could be constructed essentially like the larger 4'×8' trailer illustrated.

A loading ramp 70 is provided of low weight, of economical construction and of good aesthetics, but the ramp is of adequate stength for loading on and off platform 14 of vehicles of the types mentioned, i.e., three-wheelers, dune-buggies and various types of motorcycles and the like.

Ramp 70 has a first tub 72 of U-shape bent into a long base portion 74 and shorter arm portions 76. In the ramp shown in FIG. 1, second and third tubes 78, 80 are disposed parallel to base portion 74 and welded to arms 76. In the ramp shown in FIG. 12 for a smaller trailer, only one tube 78 is disposed parallel to base portion 74. Otherwise, the FIG. 12 construction follows the FIG. 1 construction.

Two legs 82 welded to and extending from base portion 74 of tube 72 spaces base portions 74 from the ground in the down position of ramp 70. Legs 82 may have tips 83 of rubber-like material.

When motorcycles, three-wheelers, dune-buggies and the like are loaded onto and unloaded from trailer 10, they directly contact tubes 72, 78, 80 as the tubes are uncovered. A basic concept in fabricating ramp 70 from tubes 72, 78, 80 is that tubular portions 74, 78, 80 can be spaced a considerable distance apart because the wheels of the three-wheelers, dune-buggies and motorcycles are large and can "climb" tubes 74, 78, 80 if the tubes are spaced, for example, about eight inches on center. This approach becomes more practical with the use of legs 82, so that the first tube portion 74 is spaced above the ground and becomes the first "step", and if the uppermost tube 78, or 80 has like spacing from the rear edge of trailer 10 so that platform 14 becomes the last "step". This is to be distinguished from a structure in which the first parallel tube were used to rest on the ground and the last tube were to be at the pivot (at the rear edge of platform 14), in which case it would take five parallel tubes to perform the function accomplished by three parallel tubes 74, 78, 80 in the FIG. 1 construction. Motorcycles, three-wheelers and the like can be loaded onto the vehicle by contacting successively the ground, base portion 74, second tube 78, third tube 80, and the rear edge of platform 14. In unloading, the motorcycles and the like contact successively the rear edge of platform 14, third tube 80, second tube 78, base portion 74 and the ground.

Legs 82 are disposed in a plane extending at an acute angle to the plane of tubes 72, 76, 80, i.e., in a relatively oblique plane extending at an acute angle to the plane of tubes 72, 76, 80, such as about twenty-five degrss, for example. The oblique plane of legs 82 extends downwardly as it extends rearwardly from the plane of tubes 72, 76, 80 in the down position of the ramp. An examination of the dashed line down position of ramp 70 in FIG. 3 will show that with legs 82 in the oblique plane, base portion 74 of tube 70 is spaced farther from the ground than if legs 82 coplanar with tubes 72, 76, 80.

It will be observed that rump 70 is economical to fabricate, strong, low weight, serviceable, and attractive. It could be said that the least structure has been used that will perform the function.

The pivot joint for ramp 70 includes first and second superimposed angle-shaped members 84, 86 each including horizontal and vertical flanges at right angles to each other and a pivot bolt 88 between abutted vertical flanges. First angle-shaped member 84 is welded to one of the arms 76 which is flattened in a plane at right angles to the plane of tube 72. Actually, second angle-shaped member 86 has a second vertical flange to attach to frame 34 and is of partly channel-shaped cross-section. In the up position of ramp 70, the horizontal flanges of members 84, 86 abut and there is latch means to secure ramp 70 in up position. Members 84, 86 pivot to form an angle between horizontal flanges thereof as ramp 70 is lowered.

A latch member 90 is connected to second angle-shaped member 86 by a pivot bolt 92. Latch member 90 is an elongated bar pivoted about bolt 92 at one end with a bent outer portion 94 serving as a handle and with an inner portion 96 serving to catch the forward edge 98 of the horizontal flange of first angle-shaped member 84 to secure ramp 70 in up position. To release ramp 70 to lower the ramp to its down position, latch members 90 are turned sufficiently to release the forward edges 98 of angle-shaped members 84. A thick resilient washer 100 on bolt 92 is used to press latching handle portion 96 against the latched edge 98 of first pivot member 84. A detent not shown and a lip 102 on a plate 104 on either side of latching handle portion 96 help retain latching handle 90 in latched position against accidental release of ramp 70. A plastic button 106 is provided for anit-frictional purposes in bearing on plate 104.

The parallel tubes 78, 80 support rear lights 110 and license plate support fixtures 112.

Having thus described our invention, we do not wish to be understood as limiting ourselves for the exact construction shown and described. Instead, we wish to cover those modifications of our invention that will occur to those skilled in the art upon learning of our invention and which are within the proper scope thereof.

We claim:

1. The improvement in a vehicle to carry motorcycles, three-wheelers or the like, comprising:
    (a) a load-supporting body and wheel means supporting said body,
    (b) said body having a main broad flat platform extending throughout the major portion of said body and extending to the rear of said vehicle, said body having a narrow track member extending forwardly from said main platform in the manner of a tongue and having a ball coupler to connect to the ball of a towing vehicle so that said track member serves the function of a tongue, said platform being at least several times wider than said track member,
    (c) said track member having a single beam forming a track operative to support forward of said platform only a single wheel of a motorcycle, three-wheeler or the like in transportation and during loading onto and off of said track member, said track member having a bow member at its forward end extending in an oblique plane forwardly as it extends upwardly, said ball coupler adjustably securing to said bow member lengthwise of said bow member so as to adjust for the height of the ball of a towing vehicle, (d) said platform being formed from plywood and a metal rectangular frame therearound secured to said plywood and lateral supports under said plywood secured to said frame, (e) on each side of said body a continuous tubular retainer supported on bracket means and by said bow member and extending forwardly along the side of said platform and bending around the platform front edge and then bending along the side of said truck member, said retainer being disposed in a plane parallel to and spaced above the plane of said platform and in plan view outlying the borders of said platform and track member, strap securing means spaced along the length of said tubular retainer for securing of one end of tie-down straps having their other ends secured to said motorcycles, three-wheelers or the like, and (f) a loading ramp having a first tube of U-shape with a long base portion and shorter arm portions and connecting means pivotally connecting the end of each arm position to opposite rear portions of said platform, at least a second tube juxtaposed to and spaced from said base portion and secured to said arm portions medially thereof, and leg means on said base portion of said first tube on the side away from the pivotal connection thereof operative to rest on the ground when the ramp is lowered whereby said leg means spaces said base portion from the ground and whereby motorcycles, three-wheelers and the like can be loaded onto and unloaded from the vehicle by contacting successively, in loading, the ground, said base portion, said second tube and the rear portion of said platform and by contacting successively, in unloading, the rear portion of said platform, said second tube, said base portion, and the ground, the tubes of said rump being uncovered so that they are the direct load carrying ramp members.

2. The improvement in a vehicle to carry motorcycles, three-wheelers or the like, comprising:
(a) a load-supporting body and wheel means supporting said body,
(b) said body having a main broad flat platform extending throughout the major portion of said body and extending to the rear of said vehicle, said body having a narrow track member extending forwardly from said main platform in the manner of a tongue and having a ball coupler to connect to the ball of a towing vehicle so that said track members serves the function of a tongue, said platform being at least seeral times wider than said track member,
(c) said track member having a single beam forming a track operative to support forward of said platform only a single wheel of a motorcycle, three-wheeler or the like in transportation and during loading onto and off of said track member, said track member having a bow member at its forward end extending in an oblique plane forwardly as it extends upwardly, said ball coupler adjustably securing to said bow member lengthwise of said bow member so as to adjust for the height of the ball of a towing vehicle, and
(d) securing means at spaced locations around the circumference of said body for the securing of one end of tie-down straps having their other ends secured to said motorcycles, three-wheelers or the like.

3. The improvement in a vehicle to carry motorcycles, three-wheelers or the like, comprising:
(a) a load-supporting body and wheel means supporting said body, and
(b) said body having a main broad platform extending to the rear of said vehicle and having a narrow track member extending forwardly from said main platform in the manner of a tongue and having coupler means to connect to a towing vehicle so that said track member serves the function of a tongue, said platform being at least several times wider than said track member, said track member including a beam operative to support the front wheel of a motorcycle, three-wheeler or the like in a position forward of said platform.

4. The subject matter of claim 3 in which said track member is adapted to support only the front wheel of a single motorcycle, three-wheeler or the like and said platform is of a size to support the rear portion of such single motorcycle, three-wheeler or the like plus one or more other motorcycles, three-wheelers or the like.

5. The subject matter of claim 3 in which said beam is no more than six inches wide to accommodate the loading of the width of only a single wheel.

6. The subject matter of claim 3 in which there is front wheel securing means removably mounted on said beam of trough shaped cross-section operative to receive the front wheel of a motorcycle or the like against lateral escape.

7. The subject matter of claim 5 in which said platform is formed of plywood and a metal rectangular frame therearound secured to said plywood and lateral supports under said plywood secured to said frame.

8. The subject matter of claim 5 in which there is securing means at spaced locations around the circumference of said body for the securing of one end of tie-down straps having their other ends secured to said motorcycles, three-wheelers or the like.

9. The subject matter of claim 5 in which on each side of said body there is a tubular retainer including supporting bracket means, said tubular retainer continuously extending forwardly along the side of said platform and bending around the platform front edge and then bending along the side of said track member, said retainer being disposed in a plane parallel to and spaced above the plane of said platform and strap securing means spaced along said tubular retainer for the securing of one end of tie-down straps having their other ends secured to said motorcycles, three-wheelers or the like, said tubular retainer forming a railing for prevention of escape of wheels of motorcycles, three-wheelers and the like past said tubular retainer.

10. The subject matter of claim 9 in which there are clamp fittings encircling said tubular retainers at the locations of said bracket means and clips also located at the locations of said bracket means with openings for securement of such straps and forming said strap securing means.

11. The subject matter of claim 9 in which in plan view said tubular retainers outlay the borders of said platform and track member to increase the effective widths of said platform.

12. A loading ramp for a trailer to carry wheeled apparatus such as motorcycles or three-wheelers, comprising:
(a) a first tube bent into a U-shape, with a long base portion and shorter arm portions at each end and the end of each arm portion being pivotally connected to opposite rear corner portions of said trailer,
(b) at least a second and a third tube parallel to and spaced from said base portion and from each other and welded to said arm portions,
(c) a pair of spaced short tubular legs welded to and extending from the opposite side of said base portion of said first tube from said second and third tubes operative to rest on the ground when the ramp is lowered whereby said legs space said base portion of said first tube from the ground and whereby the wheeled apparatus can be loaded onto and unloaded from the trailer by contacting sucessively in loading the ground, the base portion of said first tube, said second tube, said third tube, and the rear edge of said trailer and by contacting successively in unloading the rear edge of said trailer, said third tube, said second tube, the base portion of said first tube and the ground, said legs being disposed in a first plane extending at an acute angle relative to a second plane which is the plane of said tubes, said first plane extending from the lower side of said second plane whereby in downward movement of said ramp said legs contact the ground sooner than if the legs were disposed in said second plane, and
(d) said tubes of ramp being uncovered so that said tubes are the direct load carrying ramp members.

13. A loading ramp for a trailer to carry wheeled apparatus such as motorcycles or three-wheelers, comprising:
(a) a first tube having a U-shape, with a long base portion and shorter arm portions at each end and the end of each arm portion being pivotally connected to opposite rear portions of said trailer,
(b) at least a second and a third tube parallel to and spaced from said base portion and from each other and secured to said arm portions,
(c) leg means on the opposite side of said base portion of said first tube from said second and third tubes operative to rest on the ground when the ramp is lowered whereby said leg means spaces said base portion of said first tube from the ground and whereby the wheeled apparatus can be loaded onto and unloaded from the trailer by contacting successively in loading the ground, the base portion of said first tube, said second tube, said third tube, and the rear edge of said trailer and by contacting successively in unloading the rear edge of said trailer, said third tube, said second tube, the base portion of said first tube and the ground, and
(d) said tubes of ramp being uncovered so that said tubes are the direct load carrying ramp members.

14. A loading ramp for a vehicle, such as a trailer to carry wheeled apparatus such as motorcycles or three-wheelers, comprising:
(a) a first tube bent into a U-shape, with a long base portion and shorter arm portions at each end and the end of each arm portion being pivotally connected to opposite rear corner portions of said vehicle,
(b) a second tube juxtaposed to and spaced from said base portion and welded to said arm portions midway thereof,
(c) a pair of spaced short tubular legs welded to and extending from the opposite side of said base portion of said first tube from said second tube operative to rest on the ground when the ramp is lowered whereby said legs space said base portion of said first tube from the ground and whereby the wheeled apparatus can be loaded onto and unloaded from the vehicle by contacting successively in loading the ground, the base portion of said first tube, said second tube, and the rear edge of said vehicle and by contacting successively in unloading the rear edge of said vehicle, said second tube, the base portion of said first tube and the ground, said legs being disposed in a first plane extending at an acute angle relative to a second plane which is the plane of said tubes, said first plane extending from the lower side of said second plane whereby in downward movement of said ramp said legs contact the ground sooner than if the legs were disposed in said second plane, and
(d) said tubes of the ramp being uncovered and said ramp being vacant between said tubes so that said tubes are the direct load carrying ramp members.

15. A loading ramp for a vehicle, such as a trailer to carry wheeled apparatus such as motorcycles or three-wheelers, comprising:
(a) a first tube having a U-shape, with a long base portion and shorter arm portions at each end and connecting means pivotally connecting the end of each arm portion to opposite rear portions of said vehicle,
(b) a second tube juxtaposed to and spaced from said base portion and secured to said arm portions medially thereof,
(c) leg means on the opposite side of said base portion of said first tube from said second tube operative to rest on the ground when the ramp is lowered whereby said leg means spaces said base portion of said first tube from the gound and whereby the wheeled apparatus can be loaded onto and unloaded from the vehicle by contacting successively in loading the ground, the base portion of said first tube, said second tube, and the rear portion of said vehicle and by contacting successively in unloading the rear portion of said vehicle, said second tube, the base portion of said first tube and the ground, and
(d) said tubes of the ramp being uncovered so that said tubes are the direct load carrying ramp members.

16. The subject matter of claim 15 in which said connecting means at each opposite rear portion of said vehicle includes first and second superimposed angle-shaped members each formed by horizontal and vertical flanges at right angles to each other and pivot means forming a pivotal connection between said vertical flanges of said first and second angle-shaped members, said first angle-shaped member being attached to one end of said first tube and said second angle-shaped member attached to said vehicle, in the up position of the ramp, said horizontal flanges of said angle-shaped members abutting and latch means acting therebetween securing the ramp in up position, said angle-shaped members pivoting to form an angle between said horizontal flanges thereof as the ramp is lowered.

17. The subject matter of claim 16 in which said latch means includes a latch member connected to said second angle-shaped member and pivoting about an upright axis and catching the forward edge of said first angle-shaped member when the ramp is in up position and when latch member is rotated to latched position.

18. The subject matter of claim 17 in which said latch member is an elongated bar pivoted about one end and having the remainder bent with a bent outer portion serving as a handle and with an inner portion serving to catch the forward edge of the horizontal flange of said first angle-shaped member.

19. The subject matter of claim 16 in which each end of said first tube is flattened in a plane at right angles to the plane of said tubes and is welded to said vertical flange of said first angle-shaped member.

20. The subject matter of claim 15 in which there are spaced rear lights and a license tag supporter all hung from said second tube.

* * * * *